United States Patent [19]
Macdonald

[11] Patent Number: 6,053,292
[45] Date of Patent: Apr. 25, 2000

[54] TORQUE CONVERTER HAVING RESILIENTLY LOADED BYPASS CLUTCH PISTON

[75] Inventor: Fraser John Macdonald, Farmington Hills, Mich.

[73] Assignee: Ford Global Technologies, Inc., Dearborn, Mich.

[21] Appl. No.: 09/237,983

[22] Filed: Jan. 25, 1999

[51] Int. Cl.[7] .................................................. F16D 33/00
[52] U.S. Cl. ............................................ 192/3.28; 192/3.3
[58] Field of Search .................................... 192/3.29, 3.3, 192/3.31

[56] References Cited

U.S. PATENT DOCUMENTS

| | | | |
|---|---|---|---|
| 5,383,540 | 1/1995 | MacDonald | 192/3.29 |
| 5,477,950 | 12/1995 | Maloof | 192/3.29 |
| 5,826,688 | 10/1998 | Arhab et al. | 192/3.29 |

*Primary Examiner*—Charles A Marmor
*Assistant Examiner*—Tisha D. Waddell
*Attorney, Agent, or Firm*—Frank G. McKenzie

[57] ABSTRACT

A hydrokinetic torque converter includes an impeller cover and a bypass clutch. A drive ring is located between adjacent surfaces of the cover and a clutch piston, which moves axially on a support surface. The piston is welded at a radially outer position to thin clutch plate, which is supported at another radial location on the cover. As the piston moves into engagement with the ring and cover, the clutch plate permits this movement by bending elastically. When clutch apply pressure is reduced, energy stored in the clutch plate is used to move the piston out of engagement with the drive ring and cover.

8 Claims, 3 Drawing Sheets

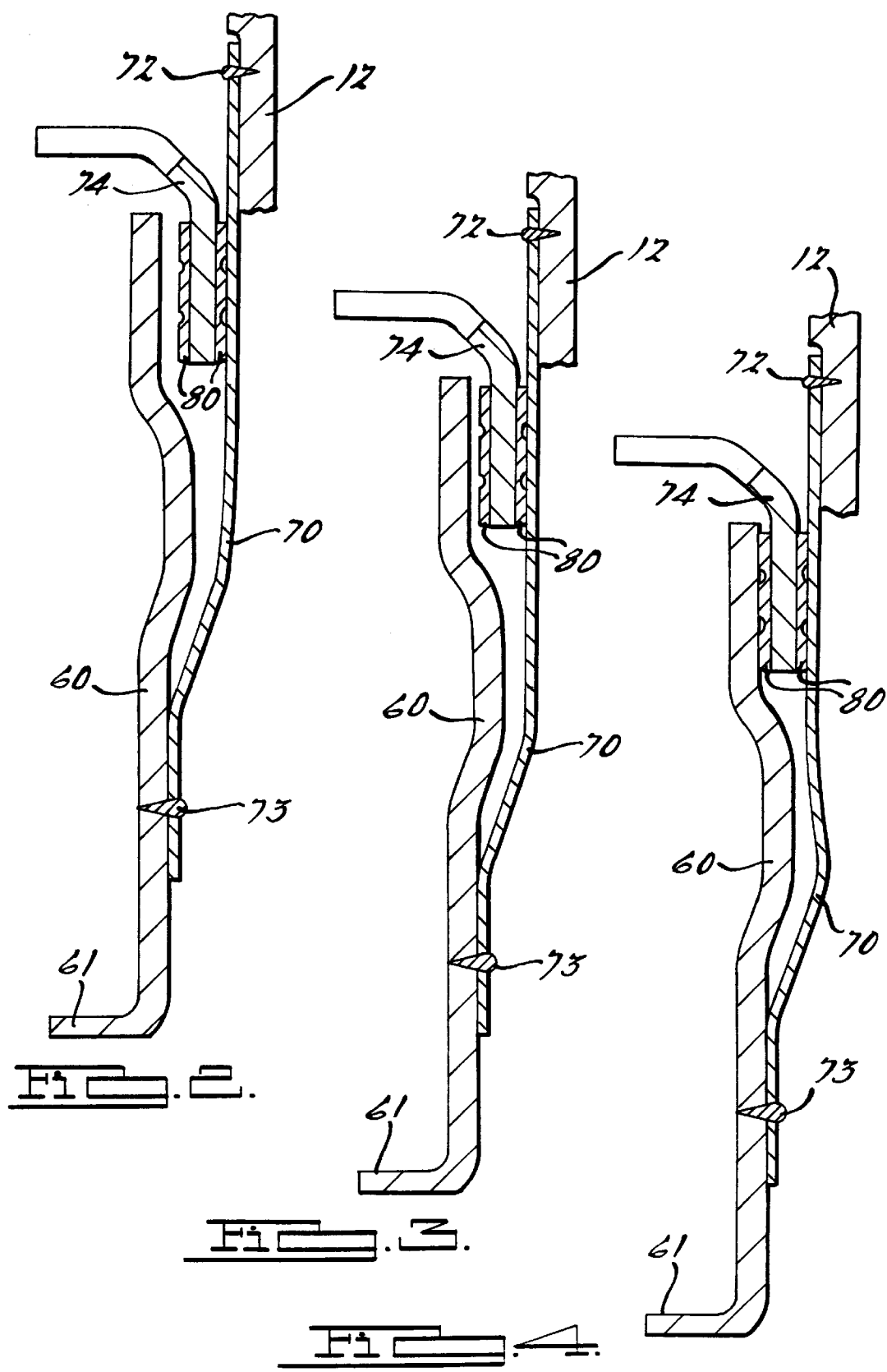

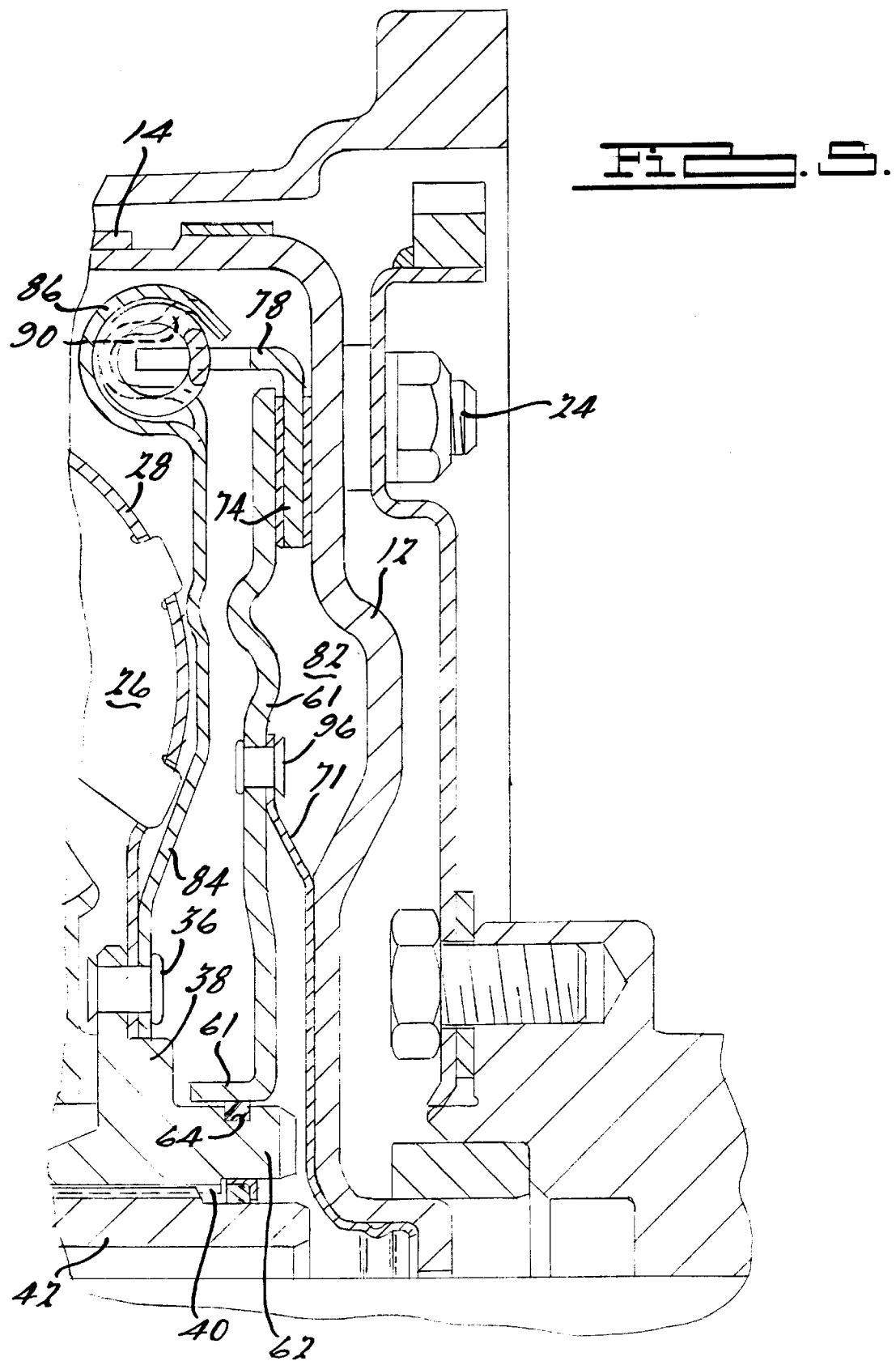

TORQUE CONVERTER HAVING RESILIENTLY LOADED BYPASS CLUTCH PISTON

BACKGROUND OF THE INVENTION

1. Field of the Invention

This invention relates to the field of automatic transmission hydrokinetic torque converters. The invention pertains particularly to a bypass clutch for a torque converter.

2. Description of the Prior Art

A device for deducing noise and vibration in a torque converter bypass clutch is described in U.S. Pat. No. 5,477,950, which is assigned to the assignee of this invention. The hydrokinetic torque converter includes an impeller wheel and turbine wheel. The housing for the impeller includes a lockup clutch assembly having a clutch plate that engages a friction surface on the impeller housing. The clutch plate carries friction material that establishes a frictional driving connection between the impeller and the turbine when differential pressure across the clutch plate is sufficient to establish a clutch-engaging force.

The clutch plate is connected through a damper assembly to the hub of the turbine, thus establishing a mechanical torque transfer between an engine crankshaft and the turbine shaft, which bypasses the hydrokinetic torque flow path through the torque converter.

The clutch plate is both welded to the impeller cover and pinned to the clutch piston. Furthermore, the pin that connects the piston and plate carries a spring-loaded detent ball that is forced radially outward from the piston into contact with the plate. This arrangement driveably connects the plate and piston, and transmits torque between the components of the assembly without producing noise, despite engine speed torque and speed variations.

It is preferable that a minimum number of parts be used to produce a resilient connection between the impeller cover and bypass clutch piston including elimination of the thrust washer between the turbine hub and clutch piston.

SUMMARY OF THE INVENTION

It is an object of the present invention to prevent torque converter bypass clutch idle rattle, a noise generated by engine firing pulses at idle speed, by eliminating backlash between the converter cover and bypass clutch piston. It is another object to eliminate impact loads associated with this backlash, thereby increasing durability of the bypass clutch.

This invention accomplishes these objects with the advantage that the number of parts is minimized and the construction is simplified in relation to a conventional bypass clutch arrangement.

In realizing these objects and advantages, a bypass clutch, according to this invention, includes a bladed wheel, such as a turbine wheel, supported for rotation about an axis; a cover supported for rotation about the axis and having a first surface facing the wheel; a piston supported for displacement relative to the cover and for rotation about said axis, having a second surface facing the first surface; a clutch plate located between the piston and casing, fixed to the piston at a first location, fixed to the cover at a second location spaced radially from the first location, the disc adapted for elastic bending deflection between the first location and second location due to movement of the piston relative to the cover, said deflection tending to resist movement of the piston toward the cover and tending to displace the piston away from the cover; and a drive ring supported for axial displacement, having a radial leg located between the first surface and the second surface, the piston adapted to driveably engage the drive ring and the drive ring adapted to driveably engage the clutch plate as the clutch is applied and the clutch plate deflects.

BRIEF DESCRIPTION OF THE DRAWINGS

FIGS. 2–4 are cross sections of the torque converter of FIG. 1 in the vicinity of the bypass clutch piston showing the piston at various positions along its range of travel.

FIG. 5 is a cross section showing an alternate embodiment of the invention.

DESCRIPTION OF THE PREFERRED EMBODIMENT

Figure 1:
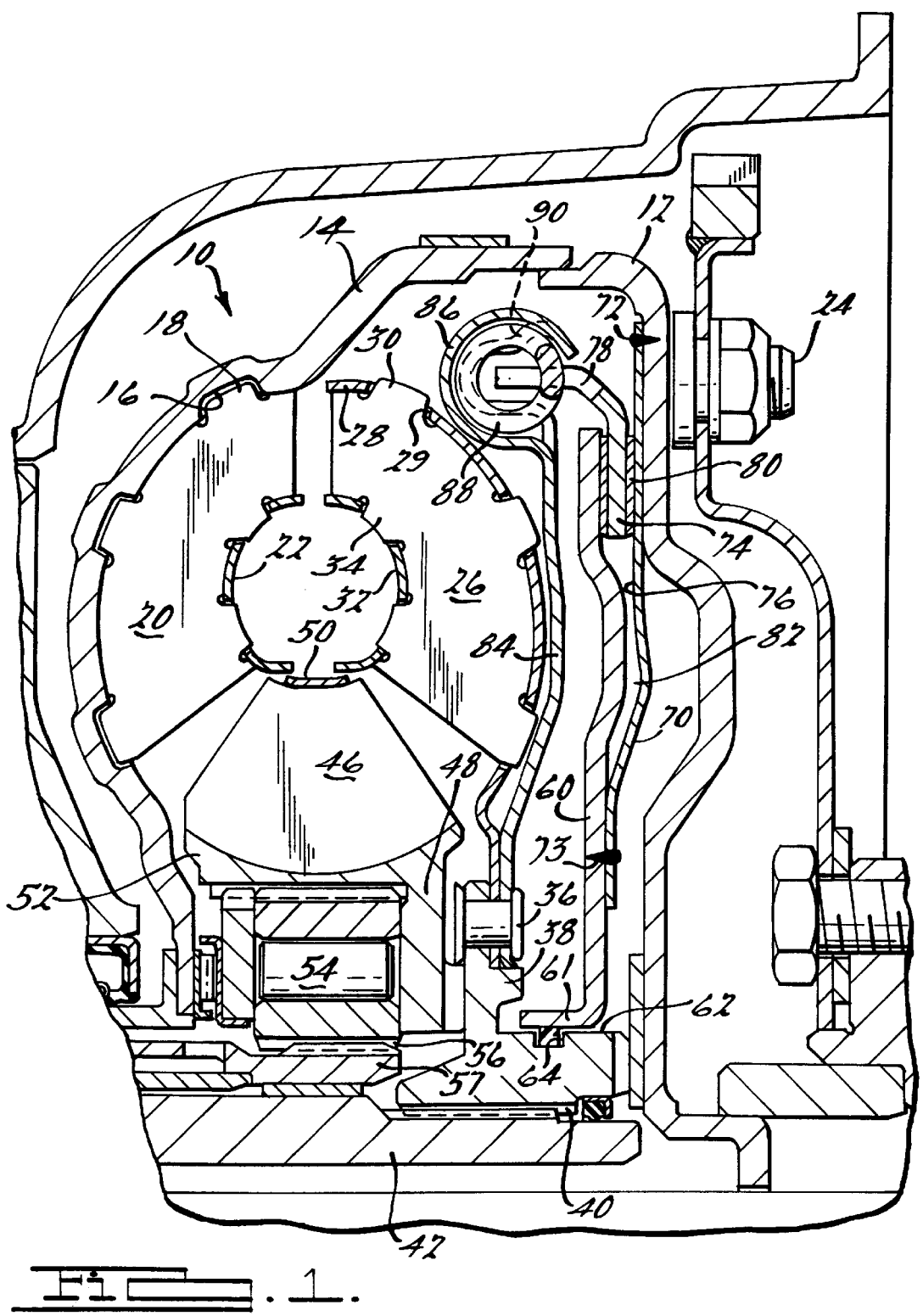
FIG. 1 is a cross section of a torque converter, taken at a plane defined by axial and lateral axes, showing a bypass clutch according to the invention.

Referring first to FIG. 1, a torque converter includes an impeller cover 12 welded to an impeller shell 14 having recesses 16, which receive tabs 18 located on the outer surface of impeller blades 20. The impeller blades are retained between shell 14 and an inner impeller shroud 22. Cover 12 is driveably connected to an engine crankshaft.

Impeller cover 12 supports a circular pattern of threaded studs 24 to which a flywheel, rotatably supported on the engine crankshaft, is bolted, thereby driveably connecting the cover to an engine.

Turbine blades 26 are spaced mutually about the axis of rotation and are located with respect to the impeller blades so that a toroidal fluid flow path within the torque converter exits the impeller and enters the turbine at the radially outer area and leaves the turbine at the radially inner area. The outer periphery of the turbine blades is fixed mechanically or by welding or brazing to a turbine shell 28, which has openings 29 that receive tabs 30 formed on the turbine blades. The inner periphery of the turbine blades is connected to an inner turbine shroud 32 by locating tabs 34 within slots formed in shroud 32 and by bending the tabs over the inner surface of the shroud, thereby fixing the position of blades 26 between shell 28 and shroud 32. Turbine shell 28 and retainer 97 are secured by rivets 36 to a turbine hub 38 having an internally splined surface 40 adapted to engage an externally splined surface on a transmission input shaft 42.

Located between the flow exit section of the turbine and the flow entrance section of the impeller is a stator assembly comprising stator blades 46, spaced mutually around the axis of rotation, a hub 48 supporting blades 46, an inner shroud 50 connecting the radially inner tips of the stator blades, and an outer shroud 52 connecting the radially outer ends of the stator blades. An overrunning brake 54, fixed by splines 56 to a stationary shaft 57, provides one-way braking between the stator blades 46 and the sleeve shaft.

A bypass clutch includes a piston 60 formed with a flange 61 that is slideably mounted on an axially directed surface 62 formed on turbine hub 38 and sealed against the passage of hydraulic fluid by an O-ring seal 64, located in a recess formed in surface 62.

A clutch plate 70 is fixed to the inner surface of impeller cover 12 by a 360 degree laser weld or resistance weld 72 located near a radially outer edge of the plate. The weld provides a seal against the passage of hydraulic fluid between the axially outer surface of plate 70 and the adjacent inner surface of the cover 12. Plate 70 is welded similarly to piston 60 by a 360 degree laser weld or resistance weld 73 located near a radially inner edge of the plate. Clutch plate 70 and piston 60 are driveably connected when the bypass clutch is engaged due to mutual frictional engagement.

Drive ring 74 includes a radial leg, located between the axial inner face 76 of clutch plate 70 and the outer face of piston 60; and axial legs 78, spaced mutually angularly about the axis of rotation and directed toward the turbine wheel. The surfaces of the radial leg that face plate 70 and piston 60 carry friction material 80, commonly referred to as "paper face" material, bonded to the axially inner radial surface of plate 70 by a bonding technique described by Frosbie, Milek and Smith in SAE Design Practices, Vol. 5 (1962).

Drive ring 74 is supported for axial sliding movement as it moves toward plate 70 due to contact with piston 60 and away from the plate as pressure within control chamber 82 varies in relation to pressure on the axially opposite side of the piston.

Each of the legs 78 of drive ring 74 is located for contact with a damper spring, as described below. The turbine shroud 28 and a torque converter damper spring retainer 84 are joined to a radially extending flange of turbine hub 38 at a riveted connection 36. At the radially outer end of retainer 84, several arcuate spring retainer flanges 86, spaced angularly about the axis at intervals corresponding to the location and arcuate lengths of the damper springs 88, are formed. Flanges 86 define a substantially circular tubular cavity, in which are located four angularly spaced, helically-coiled damper springs 88. Preferably, two longer damper springs are formed with an actuate shape; two shorter springs are formed straight and then bent to the contour of the arcuate flanges 86, in which they are located. At four angularly spaced locations about the central axis of the torque converter, flange 86 of the damper support 84 is formed integrally with local stop flanges 90, adjacent pairs of stop flanges, which define the extremities of annular pockets of the damper where each spring 88 is located. Each stop flange provides a surface that stops an end of a spring from moving in response to displacement of the legs 78. Details of the damper assembly are described in U.S. Ser. No. 08/891,911, filed Jul. 14, 1997, which application is assigned to the assignor of this invention.

Piston 60 moves axially toward clutch plate 70 due to differential hydraulic pressure across the piston and away from the clutch plate as pressure within control chamber 82 rises in relation to pressure on the axially opposite side of the piston. Piston 60 also rotates about the axis when it is driveably connected to plate 70 because impeller cover 12 is connected to the engine crankshaft. This rotary movement of the piston forces legs 78 into contact with the ends of springs 88 causing them to compress, store energy and dissipate energy due to contact of the spring on the inner surfaces of flanges 86.

Each of the axially directed legs 78 of the drive ring 74 is located within a space located between angularly opposite ends of each of the damper springs. Engine torque is transmitted through piston 60 to the damper assembly by bearing contact between axial legs 78 and the adjacent ends of the damper springs.

Chamber 82, bounded by piston 60, cover 12, and clutch plate 70, is a control pressure chamber, which communicates with a control pressure source through a passage in a manner described in U.S. Pat. No. 4,633,738, which is assigned to the assignor of this invention. By controlling pressure in chamber 82, a pressure differential across piston 60 can be controlled. The pressure in the torus flow cavity on the left-hand side of piston 60 tends to move the piston and ring 74 rightward. This movement causes the mutually facing surfaces on clutch plate 70, ring 74 and piston 60 to become driveably engaged due to frictional contact. By appropriately modulating the pressure in chamber 82, controlled slipping will occur between the cover and piston. Torque fluctuation developed in the driveline due to engine torque perturbations and other torque transmitting irregularities are modulated through operation of the damper assembly.

The piston is driveably connected through the damper assembly resiliently through the damper springs to retainer 84, via the attachment at rivets 36 to the turbine rotor, and through hub 38 to the transmission input shaft 42.

FIG. 2 shows piston 60 located at the left-hand extremity of its travel and out of contact with drive ring 74 and clutch plate 70, the bypass clutch being disengaged. The piston is urged to this location due to elastic, resilient flexure of plate 70 when the pressure differential across the piston is removed. When differential pressure across the clutch piston 60 rises, the piston moves rightward on surface 62 to the position of FIG. 3 against the resistance caused by bending through the thickness of plate 70. As differential pressure across the clutch piston 60 rises further, the piston moves further rightward on surface 62 to the position of FIG. 4 against the resistance caused by bending of plate 70. This brings the piston into frictional contact with the friction material on disc 74 and forces the disc into frictional contact with plate 70, thereby fully engaging the torque converter bypass clutch.

When clutch apply pressure is reduced, the potential energy stored in disc 70 due to its flexural deformation is used to move the disc leftward on surface 62 to the position of FIG. 2.

Various elastically resilient elements, such as Belleville, wave, strap, finger, coil, or clock springs may be substituted for the disc springs or plate 70 described above.

Riveting or bolting may be used instead of welding to attach the disc to the cover or piston. For example, FIG. 5 shows an alternate form of the invention in which a disc 71 is connected to the piston 61 by angularly spaced rivets 96. Disc 71, symmetrically disposed about the central axis of the assembly, closely conforms to that portion of the contour of cover 12 that is located radially inward of rivets 96. In this way disc 71 is fixed to the piston at the location of the rivets 96 and is supported in bending on the cover at the location, at the base of the conical surface of the disc where the cover and disc are in mutual contact.

Flexural deformation of disc 71 permits movement of the piston rightward causing mutual frictional engagement of the piston, drive ring 74 and cover 12. When clutch apply pressure is reduced, the potential energy stored in disc 71 due to its flexural deformation is used to move the disc leftward on surface 62 to the disengaged position.

Discs 70 and 71 are 1.0–1.5 mm thick and preferably formed of high strength, low carbon alloy 950 structural sheet steel.

Since there is no running clearance to permit axial movement of the piston, no impact noise is possible despite engine firing pulses.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

I claim:

1. A bypass clutch for the torque converter of an automatic transmission for an automotive vehicle, comprising:

a cover fixed against axial displacement, supported for rotation about an axis, having a first surface;

a piston supported for rotation about said axis, having a second surface facing the first surface, the piston supported for displacement relative to said cover; and a clutch plate located between the piston and casing, fixed to the piston at a first location, supported against displacement toward the cover at a second location spaced radially from the first location, the clutch plate adapted for elastic bending deflection between the first location and second location due to movement of the piston relative to the cover, said deflection tending to resist movement of the piston toward the cover and tending to displace the piston away from the cover.

2. The bypass clutch of claim 1, further comprising:

a first weld mutually fixing the piston and clutch plate at the first location; and a second weld mutually fixing the clutch plate and cover at the second location.

3. The bypass clutch of claim 1, further comprising:

first rivets fixing mutually the piston and clutch plate at the first location; and wherein the clutch plate is supported on the cover at the second location due to mutual contact at the second location of the clutch plate and cover.

4. The bypass clutch of claim 1, further comprising a drive ring supported for axial displacement, having a radial leg located between the first surface and the second surface, the piston adapted to driveably engage the drive ring and the drive ring adapted to driveably engage the clutch plate as the clutch is applied and the clutch plate deflects.

5. A bypass clutch for the torque converter of an automatic transmission for an automotive vehicle, comprising:

a bladed wheel supported for rotation about an axis;

a cover supported for rotation about said axis, fixed against axial displacement, having a first surface facing the wheel;

a piston supported for displacement relative to said cover and for rotation about said axis, having a second surface facing the first surface;

a clutch plate located between the piston and casing, fixed to the piston at a first location, supported against displacement toward the cover at a second location spaced radially from the first location, the clutch plate adapted for elastic bending deflection between the first location and second location due to movement of the piston relative to the cover, said deflection tending to resist movement of the piston toward the cover and tending to displace the piston away from the cover; and a drive ring supported for axial displacement, having a radial leg located between the first surface and the second surface, the piston adapted to driveably engage the drive ring and the drive ring adapted to driveably engage the clutch plate as the clutch is applied and the clutch plate deflects.

6. The bypass clutch of claim 5, further comprising:

first rivets fixing mutually the piston and clutch plate at the first location; and wherein the clutch plate is supported on the cover at the second location due to mutual contact at the second location of the clutch plate and cover.

7. A bypass clutch for the torque converter of an automatic transmission for an automotive vehicle, comprising:

a bladed wheel supported for rotation about an axis;

a cover supported for rotation about said axis, fixed against axial displacement, having a first surface facing the wheel;

a piston supported for displacement relative to said cover and for rotation about said axis, having a second surface facing the first surface;

a clutch plate located between the piston and casing, fixed to the piston at a first location, fixed to the cover at a second location spaced radially from the first location, the clutch plate adapted for elastic bending deflection between the first location and second location due to movement of the piston relative to the cover, said deflection tending to resist movement of the piston toward the cover and tending to displace the piston away from the cover; and a drive ring supported for axial displacement, having a radial leg located between the first surface and the second surface, the piston adapted to driveably engage the drive ring and the drive ring adapted to driveably engage the clutch plate as the clutch is applied and the clutch plate deflects.

8. The bypass clutch of claim 7 further comprising:

a first weld mutually fixing the piston and clutch plate at the first location; and a second weld mutually fixing the clutch plate and cover at the second location.

* * * * *